United States Patent

Bowen

[15] 3,680,908

[45] Aug. 1, 1972

[54] CANTILEVERED CAMPING VEHICLE BED CONSTRUCTION

[72] Inventor: Duane C. Bowen, c/o Construction Trades Center, 2541 State St., Carlsbad, Calif. 92008

[22] Filed: Aug. 11, 1970

[21] Appl. No.: 62,943

[52] U.S. Cl. ........................ 296/23 R, 296/27, 52/66
[51] Int. Cl. ............................................. B60p 3/32
[58] Field of Search ................. 296/23, 26, 27; 52/66

[56] References Cited

UNITED STATES PATENTS 3,575,460   4/1971   Kennedy ......................... 296/27
3,377,098   4/1968   Bontrager ........................ 296/27
3,275,369   9/1966   Ecke ............................ 296/23 R
2,706,132   4/1955   Chaffin ......................... 296/23 R Primary Examiner—Philip Goodman
Attorney—Duane C. Bowen

[57] ABSTRACT

In a camper with flat top, a flat roof panel, pulling out from the top, which is flanged to drain rain outwardly, and covers single or double bunked pull-out cantilevered beds.

10 Claims, 20 Drawing Figures

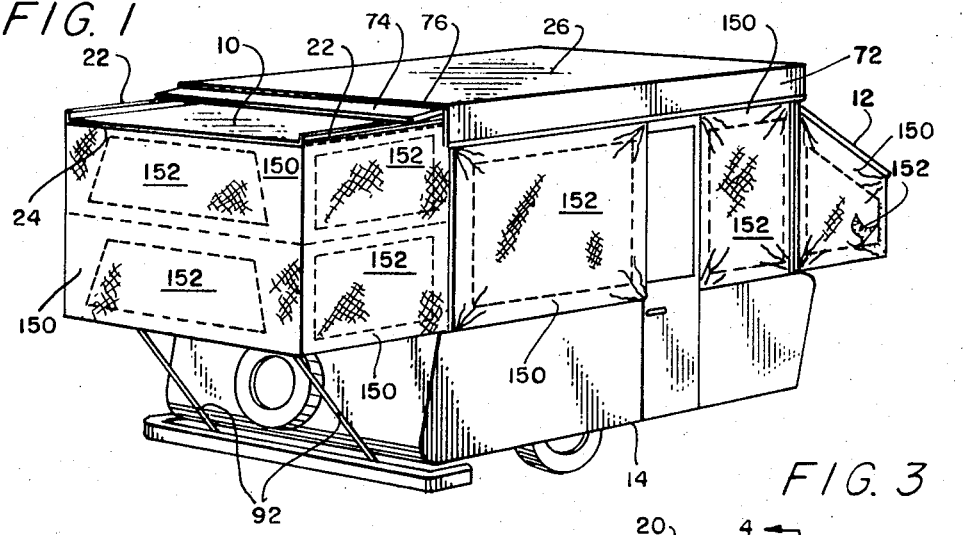
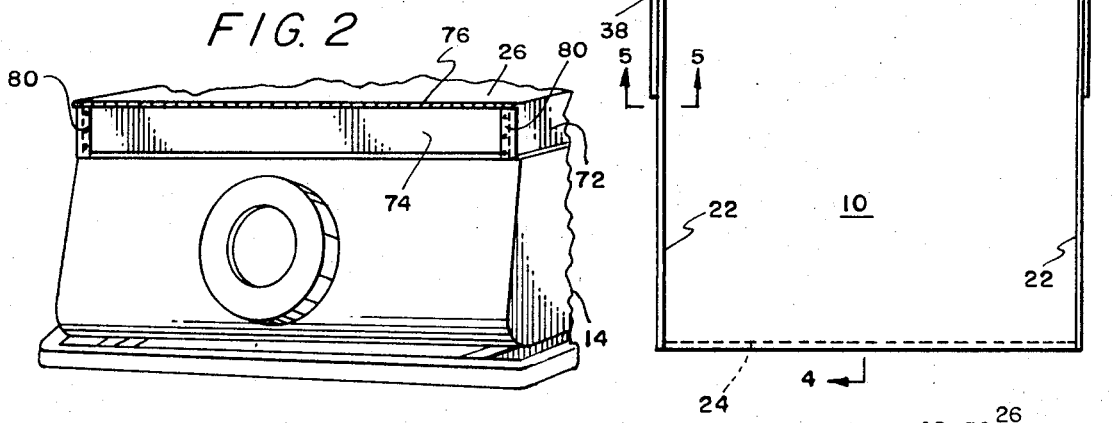
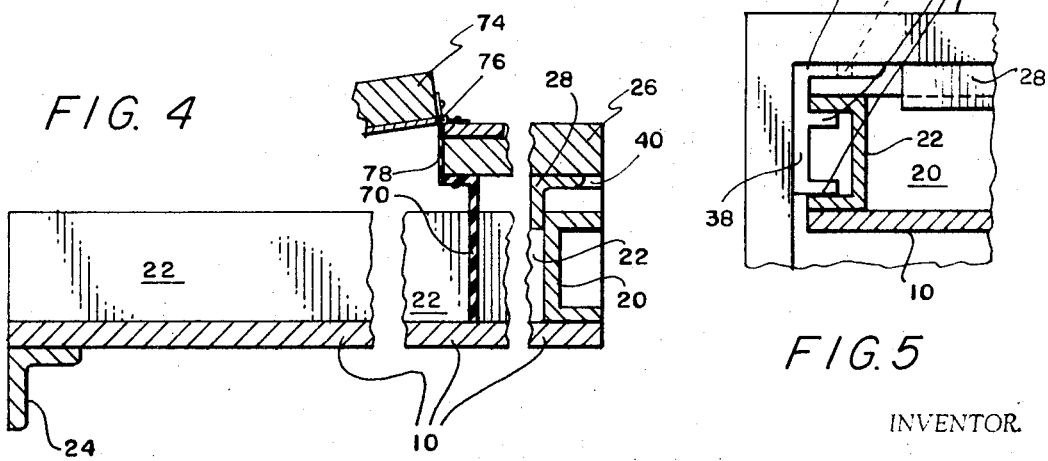

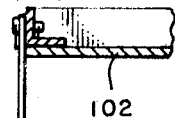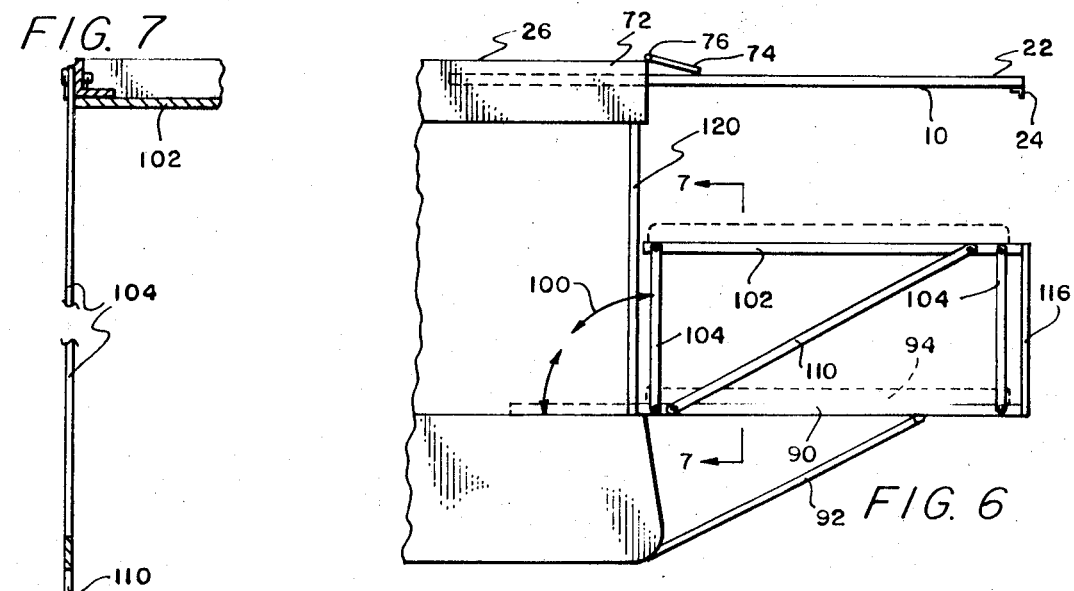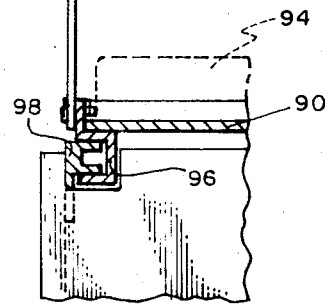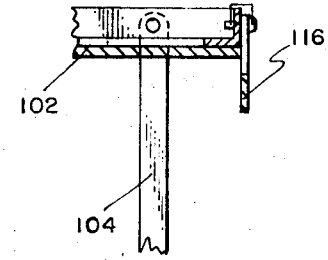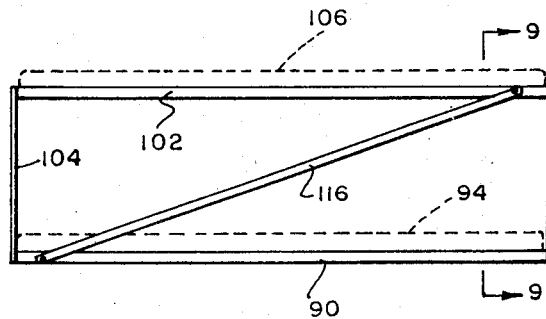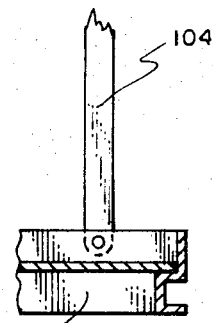

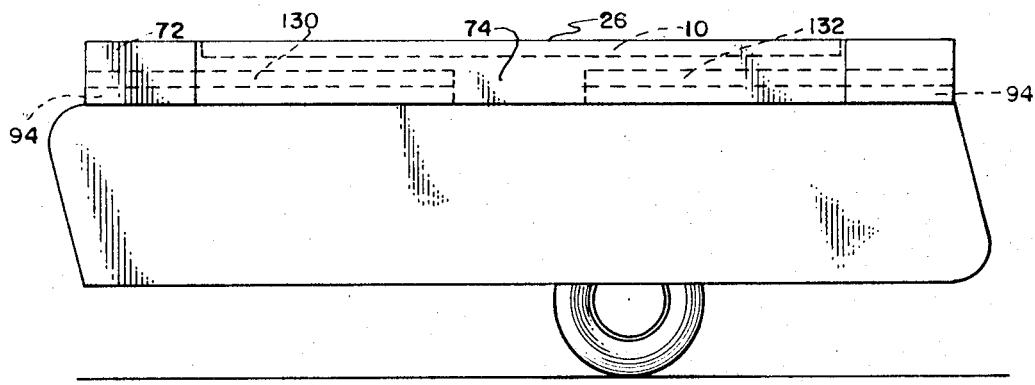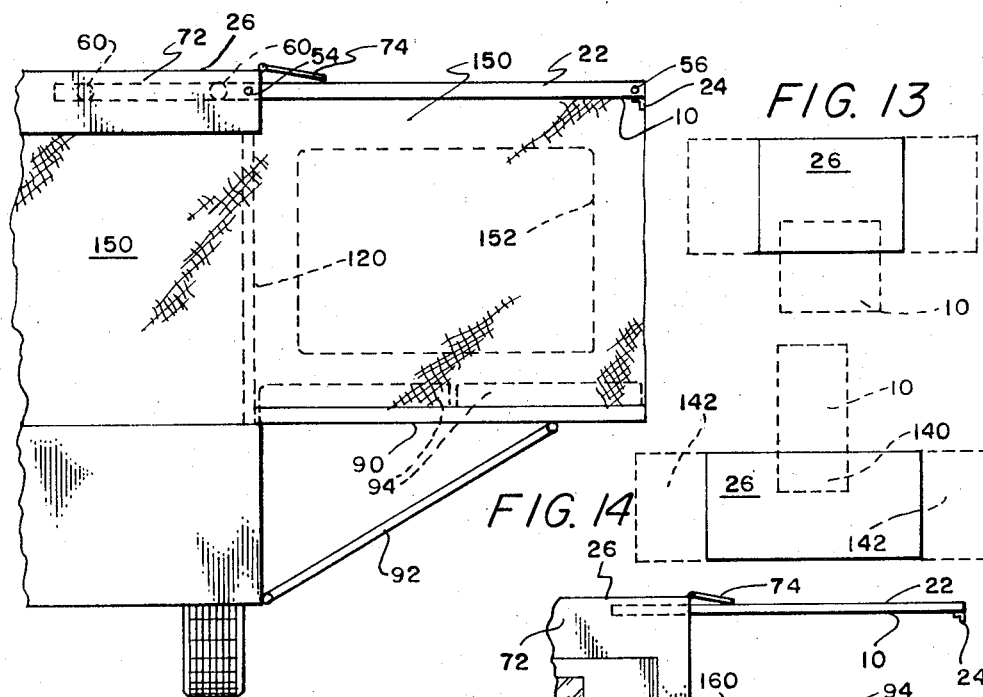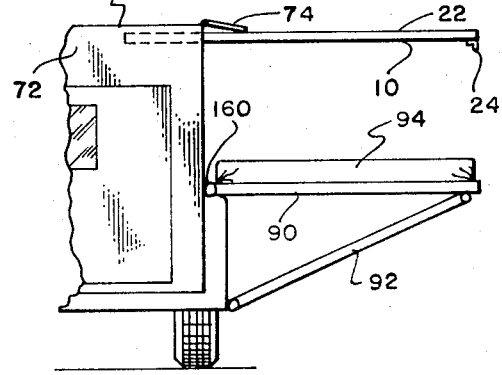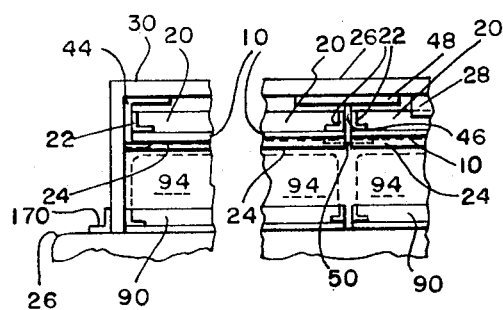

INVENTOR.
Duane C. Bowen

CANTILEVERED CAMPING VEHICLE BED CONSTRUCTION

BRIEF SUMMARY OF THE INVENTION AND OBJECTIVES

My invention relates to providing extra sleeping and floor room. The additional sleeping room in the form of a pull-out cantilevered bed, single or double bunked. The extra floor room is in terms of clearing out floor area which otherwise would be devoted to sleeping. The upper bed panel of double bunks pivots into sleeping position from a retracted position on the lower bed panel of the double bunks, and locks in upper position.

Cost of camping facilities such as collapsible trailers, pickup campers and mobile trailers depends partly on square foot floor area. The purchasers make compromises in terms of desired area versus cost and also take into consideration the weight of larger units, wind drag of higher or non-collapsible units, etc. One function of a camping vehicle is providing sleeping room and various models will provide room for two, four, six or eight persons, etc. Another function is providing room for other purposes such as cooking, eating, dressing, card playing and other recreation, etc. To the extent that it is economically and otherwise feasible to provide sleeping room in the form of cantilevered pull-out beds, more floor area is available for purposes other than sleeping. It is an object of my invention to improve sleeping accommodations in a camping vehicle and to provide more floor area for non-sleeping purposes by providing sleeping accommodations in the form of cantilevered pull-out beds. It is a further objective of my invention to provide, in appropriate circumstances, double bunking of beds (usually each of double bed size) in order to increase sleeping capability with minimum space, cost, etc. It is an objective to provide a structural system for accommodating double bunking.

Another objective of my invention is to provide a flat pull-out roof from a camping vehicle (usually flat topped) in order to provide the greatest room in cubical sleeping volume in the available area, as contrasted to a sloping rigid or fabric roof with less cubical volume. A problem with a flat roof pulling out of a camping vehicle is control of water in case of rain and it is a further objective of my invention to provide a system of flanges to direct water outwardly.

It is an additional objective of my invention to provide sleeping accommodations adaptable to various camping vehicles such as folding camper trailers, pickup covers or campers, mobile rigid trailers, etc. The objectives of my invention include to provide such sleeping accommodations in designs requiring minimum modifications of these mass produced camping vehicles, so that modification costs will be minimized, and to provide such accommodations in other designs requiring no modifications of existing camping vehicle constructions (i.e., by providing for mounting the extra sleeping accommodations on top of the existing vehicle designs), so that substantially no modification of standard camping structures will be required to add the extra sleeping units in production or the extra sleeping units can be sold separately to be added to previously purchased camping vehicles. It is another objective of my invention to standardize units of my design such as roof panels, double bunk constructions, etc., so that these may be mass produced for use in designs adapted for various kinds of camping vehicles.

My invention will be best understood, together with additional objectives and advantages thereof, from the following description, read with reference to the drawings, in which:

FIG. 1 is a perspective view of a collapsible or folding trailer forming a specific embodiment of my invention, the top being elevated in the view and the trailer being in expanded shelter-like envelope condition.

FIG. 2 is like FIG. 1 except for only showing the rear of the trailer, and the top being lowered and the trailer being in collapsed, transportation, box-like, envelope condition.

FIG. 3 is an enlarged plan view of a roof panel used in the trailer of FIGS. 1 and 2.

FIG. 4 is a broken view primarily in section, and on enlarged scale, taken on line 4—4 of FIG. 3, showing the details of the roof panel and also showing some associated trailer structure.

FIG. 5 is a view similarly to FIG. 4 only taken on line 5—5 of FIG. 3.

FIG. 6 is a partial side view of the trailer in the expanded condition of FIG. 1 but with curtains removed to show a double bunk construction, the arrow arc indicating the pivoting of upper bunk structure in erecting the bunk.

FIG. 7 is an enlarged, broken, partial, elevational view, primarily in section, taken on line 7—7 of FIG. 6.

FIG. 8 is a rear view of the double bunk structure of FIG. 6.

FIG. 9 is an enlarged, broken, partial elevational view, primarily in section, taken on line 9—9 of FIG. 8.

FIG. 10 is a typical view, primarily in section, of a fastener assembly used to temporarily connect two members, such as to secure diagonal bracing or to secure the roof panel in inner and outer positions.

FIG. 11 is a side view of a folding camping trailer of modified construction, the trailer being shown with the top lowered and in collapsed condition, the dotted lines showing the stored positions of beds extendible front and rear, and of a roof panel extendible to the side, and of side bed mattress and supporting panel or deck stored on top of the end beds.

FIG. 12 is a partial end view of portions of the camping folding trailer seen in FIG. 11, the view showing the trailer top elevated and a bunk structure extended to the side.

FIG. 13 is an essentially diagrammatical plan view of the trailer viewed in FIGS. 11 and 12.

FIG. 14 is a view like FIG. 13 only of a modified configuration.

FIG. 15 is a partial end view of another modified form of my invention in which the roof panel, in extended position, is applied to a pickup camper shell.

FIG. 16 is an enlarged, partial, broken, side view of the roof panel assembly of FIGS. 17, 18 and 19.

Figure 17:
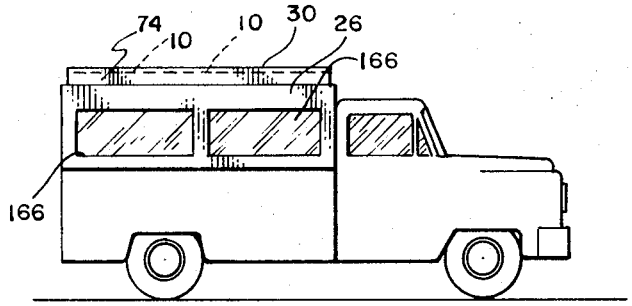
FIG. 17 is a side view of a pickup camper having the structure viewed in FIGS. 15 and 16, but showing the roof panel assembly in retracted position.

As above indicated, the purpose of my invention is to provide additional sleeping room of less cost or with less allocation of floor area for sleeping purposes, as compared with most other constructions of camping folding trailers, pickup campers, rigid camping trailers, or mobile homes, etc.

The basic unit in achieving my purposes I term a "roof panel" 10. This is essentially a flat sheet of preferably metal. Alternative materials include plywood, a laminate including a plastic foam, or other rigid sheet material. By "rigid" I mean something like plywood of a minimum one-fourth inch thickness which tends to keep its shape although it could slightly bend, as distinguished from a flexible sheet with little tendency to keep its shape, like a sheet of canvas. It will be observed I show some flanges on sheet 10 primarily for other purposes but adding some rigidity to the sheet whereby sheet 10 will not have to be as heavy as otherwise would be the case. Of course, a foam laminate would have an insulation factor and is a possibility as most folding camping trailer tops are constructed of a laminate including a foam layer for insulation. Needless to say, a flat roof panel will be rather impervious to water. I have termed panel 10 as being ". By this I mean that little purpose is served by having other than an essentially horizontal, planar roof. I don't mean to exclude the possibility of using corrugated sheet or of having limited pitch to a rigid roof. What I am primarily distinguishing is the flexible covers of prior, extendible, retractable beds cantilevered out from a camping vehicle, trailer, or the like in which a pitched canvas cover is used to shelter the beds. Such extendible, retractable, cantilevered beds have been found primarily, if not exclusively, in so-called "folding camping trailers" (with fold-out or pull-out beds and a top which is elevated before the beds are moved to cantilevered positions). In the folding camping trailers, the canvas cover will not shed rain unless it is given substantial pitch (as is the case with canvas tents) and substantial space available for a bed (or particularly double bunking of beds) is taken by the pitch of the canvas cover. It is a primary objective of my invention, and the essential meaning of the specification of a rigid flat roof panel, to avoid taking up vertical height of bed space to accommodate the pitch of a canvas or other cover of flexible material, and to achieve more vertical bed space, particularly for the purpose of double bunking of beds or to provide single level bed space where a pitched canvas top would be rather inappropriate. FIGS. 1–14 are to such folding camping trailers. It will be observed in FIG. 1 that a rigid roof panel on the left accommodates the vertical height requirement of double bunked beds whereas the pitched canvas cover 12 on the right accommodates only the vertical height requirement of a single level of bed. By means of the double bunking in FIG. 1, three double bed spaces are cantilevered from the trailer body 14 instead of two beds which would be the (common) case if both ends used the conventional structure shown at 12.

An essential purpose of a roof panel of course is to shed rain. Merely providing a flat horizontal sheet extending from inside to outside a shelter does not (even in zero wind conditions, much less with a wind) (a) direct water flow to the outside of the shelter rather than to the inside, or (b) shelter space below the sheet from rain by keeping water from draining over the sheet edges and clinging to the undersurface to drip from the central undersurface. I have found it necessary, therefore, to provide positive drainage control. In the various applications of roof panel 10 shown, each essentially have the same structure: (a) a rear upstanding marginal flange 20 to keep water from draining inwardly of body 14 or other shelter, (b) two side upstanding marginal flanges 22 to keep water from clinging to sheet 10 around its edges and under its bottom to drip therefrom (the flanges 22 also can act as part of track or guide means), and (c) a depending flange 24 at the outer edge, whereby water can discharge from the outer edge of roof panel 10, but flange 24 keeps it from clinging to the sheet and ending up dripping from the central underside of the sheet.

Rear upstanding flange 20 also can act as a stop against movement of roof panel 10 too far out from under clamping body top 26 by abutment to an angle iron flange 28 depending from the undersurface of top 26. Flange 28 will be seen in FIGS. 4 and 5. This construction will be followed in the other views or forms of invention illustrated, except in the form of invention shown in FIGS. 16, 17, 18 and 19 the roof panel has a housing 30 secured on the upper surface of the camping vehicle top 26, in which case, of course, flange 28 will be on the undersurface of housing 30. I have omitted flange 28 on the left hand side of FIG. 16 to permit clearer showing of other structure.

Roof panel 10 is guidably supported between an inner transportation position within the camping vehicle body (see FIGS. 2, 11, 17 and 18) and an outer camping or living position with the major part of panel 10 extending outwardly from the camping vehicle (see particularly FIGS. 1, 4, 6, 12, 13, 14, 15 and 19). The supporting structure, of course, involves coacting means between the camping vehicle body and roof panel 10. In a sense the supporting means could be termed "track means" or "guiding means". Commonly track means would include rollers, ball bearings or other antifrictional rolling members. I have not illustrated antifrictional mounting, except in FIG. 12, because stability of roof panel 10 in outer position contraindicates antifrictional movement (under fluctuating wind pressures, etc.) I do specify positive securing of panel 10 in outer and preferably also inner positions, but there still may not be reason to antifrictionally mount panel 10 as long as coacting channel shaped track or guide means do not involve too much friction. Control of frictional values concerns selection of materials to avoid excessive friction (perhaps Teflon coating of metal flanges, Nylon flanges, etc.) The ultimate decision can depend on cost (i.e., whether antifrictional devices are more economical than controlling maximum frictional levels otherwise.)

The guiding and supporting system shown involves, except for the models of FIGS. 16–19, the formation of upstanding side flanges 22 as channels open to the side receiving the flanges 36 of essentially channel shaped members 38 (see FIG. 5). Members 38 are modified from channel shapes by having an upper angle 40 with openings 42 for securing by screws to the underside of top panel 26. The structure of FIG. 16 is different in having side flanges 22 being merely formed of angle iron and the edges of the roof panels 10 being received at the sides by channel shaped members 44 and being received in the center by a shape 46 having an upper flange 48 and a lower flange 50 (which in effect is like a channel shape to each side). Means to secure roof panel 10 in outer position is symbolically shown at 54, and to secure panel 10 in inner position at 56, both in FIG. 12, which can be taken to be pin means secured in paired openings in track members. Alternative use of rollers is also symbolically shown in FIG. 12 by rollers 60 (specific details of application of rollers 60 to the track means will be obvious to those skilled in the art).

Roof panels 10 are normally shown as having a shape to shelter a bed with the narrower (side-to-side) dimension of the bed in the direction of pull-out of panel 10, and with the longer dimension of the bed perpendicular to the direction of panel pull-out. Usually a bed will be of double bed width (usually about 4 feet in folding camping trailer or the like) and the bed length usually will be at least 78 inches (which is sometimes the maximum width of a folding camping trailer). The above direction of bed alignment is true of the configurations shown in FIGS. 1–10, 11–13, 15, and 18–20. In FIGS. 14 and 16–17, however, bed alignment is opposite, with the longer bed dimension (i.e., 78 inches) in the direction of bed pull-out, and with the narrower bed dimension (i.e., 48 inches) at right angles to the direction of bed pullout. Of course roof panels 10 are normally larger than the beds to the extent that a substantial portion of roof panels 10 will be retained within the camping body to support the remainder of the roof panel in cantilevered position upon bed pullout. If this should cause a problem of width of the camping body (i.e., in FIGS. 14 and 16–17 if the roof panel is much over 78 inches), it will be obvious to those working in the art that telescoping guide rails (like those used in many filing cabinets) can be used to minimize the amount of roof panel remaining within the camper body upon roof panel pull-out. Braces could be used for the roof panel, like conventional braces 92 shown for lower bed decks 90, but I prefer to avoid this cost and complexity, especially because users would take extra time with braces for the roof panel. It is important to campers to spend the very minimum of time and effort in erecting folding camping trailers. Manufacturers have gone to great lengths in trailer design in order that vacationers spend only three to five minutes to erect their trailers. Pickup campers are frequently wider than folding camping trailers, so the length of roof panel would be less of a problem.

Leakage can be a problem in a camping structure, particularly in a driving rain, and I show a resilient flap 70 in FIG. 4 secured to the under side of camper top 26 (as by tacks or nails) and depending therefrom to drag on the top of roof panel 10 to form a seal. Top 26 has a depending flanges 72 (which, in standard folding trailer construction, may have a lip or seal against the upper margin of the body of the trailer). I provide a hinged flange 74 (which is also used in the housings 30 of FIGS. 16–19), pivoted about piano hinges 76, to permit roof panel 10 to be pulled out. Seals 78, 80 at top and sides respectively seal hinged flange 74 in closed transportation position. Flap 70 may be omitted and reliance against water leakage may be made on hinged flange 74 and the flanges of roof panel 10 as protection against rain in the outer camping position of roof panel 10.

As before indicated, one reason for the provision of the flat solid roof panel 10 (as distinguished from a sloping fabric roof that depends on pitch to shed rain) is to accommodate a double bunk, particularly in a folding camping trailer. FIGS. 6–11 and 19 are detailed to a double bunk bed construction. Bottom bed supporting panel or deck 90 in all beds illustrated is shown as having rather standard folding camping trailer construction and as being supported by removable tubular braces 92. As these are well established, mass produced constructions, well known in the art, I will not illustrate or describe the details of deck construction, the details of pull out mounting in the trailer, or the details of tubular braces 92, except where deviation is made to standard practices. It will be understood that decks 90 and double bed width mattresses 94 thereon are stowed within the camping trailer during transportation and are pulled out for use in camping. The guides and supports or tracks for deck 90 have various forms in manufacture but, for purposes of illustration, in FIG. 7 I show a channel 96 depending from deck 90 and a channel 98 secured to the trailer side wall providing track means for lower bed pull out.

The arcuate dotted lines 100 in FIG. 6 indicate the upper bunk deck 102 pivots from a lower transportation stored position to an upper camping functional position about legs 104 pivotally connected near the corners of lower deck 90 and upper deck 102. Upper decks 102 have preferably double bed width mattresses 106 stored thereon. Diagonal side braces 110 have at least one end detachable and fastened as by the removable, wire-secured pin 112 shown in FIG. 10. Pin 112 is a standard article of commerce in use in folding camping trailers that won't be further described or illustrated. Depending on the heaviness and quality of side legs and their pivots and the side brace, an end diagonal brace 116 (detachably secured) may be used (viewed particularly in FIG. 8).

I will now described more particularly the various models of the invention illustrated. FIGS. 1–10 deal with the principal embodiment, in providing double bunked beds at least on one end of a standard folding camping trailer. Such trailers are well known and I will mention mostly deviations from standard trailer constructions. It will be understood that top 26 is elevated for camping by some means 120 (FIG. 6) that sometimes take the form of a telescoping member with internal cables and pulleys and othertimes take the form of an articulated arm. Although it would be possible to secure to vertical member 120 the upper double bunk deck 102, I have illustrated the bunk to be self supporting.

Commonly a folding camping trailer will sleep six people, two in each of two double beds cantilevered from the trailer body in the manner illustrated at the right in FIG. 1 and two in a bed made up on a demountable table. In the configuration shown in FIG. 1 with one double bunk, six people could be accommodated, two persons sleeping cantilevered on the right and four persons sleeping cantilevered in a double bunk manner on the left, which would leave the inside of the trailer free from beds. On the other hand, instead eight people could be accommodated by putting the additional two people in the table space. It will be understood that I provide either more sleeping space or more space for other uses. If desired double bunks could be used at both right and left hand sides of the trailer shown in FIG. 1, in which case up to eight people could be accommodated for sleeping without use of the space on the in side of the trailer, which would be free for access to beds, would be free for dressing space, or could have other equipment such as a table that would not have to be taken down during sleeping periods. Those experienced with folding camping trailers will understand the advantages of the above, especially for large families, for use during inclement weather, or when some of the family want to stay up after others have retired.

FIGS. 11–14 illustrate that a single or double bunked bed instead could be accommodated to the side of the trailer, in addition to single or double bunked beds at front and rear as illustrated in FIG. 1. In this case, the roof panel, bed decks, and their supports follow essentially the same construction as FIGS. 1–10. In FIGS. 11–13 the long dimension of the bed is at right angles to the direction of bed pull out. As shown by the dotted lines in FIGS. 11, the roof panel 10 stores under top 26 in the same manner as in FIGS. 5–6, the lower deck panel may be stored at 130 above one mattress 94 for an end bed, and the lower deck mattress may be stored at 132 above the mattress 94 for the other end bed. Of course these or other side bed parts can be otherwise stowed in the trailer, but in the FIGS. 11–13 configuration there is not room between the end beds to stow the side bed structure. In FIG. 14 a somewhat longer trailer is provided (preferably at least 12 feed unfolded), so that the side opening bed fits at 140 between end beds 142 in stowed position (when the trailer is "folded"). It will be understood that FIG. 14 views the beds in extended positions. Note that bed 140 is aligned with its longest dimension in the direction of pullout (whereby three beds each four feet wide can be accommodated in a twelve foot trailer). Track or support means for the central, side-opening bed 140 will have to be different from the normal end beds which are parallel to and usually attach to the trailer side wall upper edges. However, space is provided for bed 140 in FIG. 14 and various solutions to stowing bed 140 in the central space are feasible, i.e., the lower deck panel may be merely attached to the trailer side walls during camping in the manner to be described below in connection with pickup campers, rather than being fully guided and supported for pullout and retraction. I will no further elaborate on a specific stowage method for side opening bed parts 140 in FIG. 14 as those skilled in the art will understand various alternative methods.

In part of the views of folding camping trailers and pickup campers, I have shown vertical fabric curtains 150, and slide fastener windows 152 therefor, following standard constructions in folding camping trailers, and I will not further detail these parts. Obviously, as in prior constructions, the curtains can be fully secured at all times or can be partly secured by turn buttons and grommets during erection of the camping facility. In some folding camping trailers, rigid removable walls have been substituted as curtains instead of flexible fabric. That expedient is not recommended because the fabric stows in less space (and with less time) for transportation and the stowage space saved is often needed for other camping and personal gear. Fabric curtains are not usually used in pickup campers, but I would recommend them for the cantilevered beds shown.

My roof panel system 10 and associated bed details can be applied not only to folding camping trailers but also to other camping vehicles or to other mobile homes or trailers, including camping buses or camping vehicles of panel truck or smaller size. In FIGS. 15–20 I show the application of the roof and bed systems to pickup campers, of the lower camper shell or cover height and of the higher cab-over camper height, as examples of other than folding camping trailers.

In FIG. 15, roof panel 10 slides out from under the normal roof 26 of a pickup camper, the roof only being modified by having the hinged access panel 74 and by having track means of the same types shown in FIGS. 4 and 5. In this model, the lower bed panel 90, removable tubular braces 92, etc., follow the constructions of the previous figures with the exception that the bed does not pull out but rather attachable and detachable at the inner end 160 in the manner hereafter to be described in connection with FIG. 20. This means that lower bed panel 90, tubular braces 92, mattresses 94, and any upper bunk parts (if a double bunk is used rather than a single bunk) are stowed inside the camper during transportation and are removed and then attached from outside of the camper during erection of the camping configuration. It may then be presumed that all beds shown in the various FIGS, including FIG. 15, are of double bed width, because a manufacturer will not usually go to the expense of providing such extra bed space and then only make it of single bed width.

Access to the bed space in FIG. 15 may be through a removable panel (such as a window) in the camper or from outside the camper, in which latter case the fabric curtains (not shown) would have a vertical slide fastener for purposes of "door" access. It will be understood in FIG. 15 that a double bed facility (additional to sleeping space normally used within a pickup camper) is provided with minimum modification of presently mass produced pickup camper-constructions so that the production of the FIG. 15 camper can be readily integrated into existing production tooling, part procurement, part fabrication, etc. Additionally, the FIG. 15 extra bed facility is provided with no commitment of camper internal space during camping (to sleep two or four people depending on whether single or double bunking is used) and the only commitment of internal camper space during transportation is a bit of overhead room for roof panel 10, and stowage of bed parts someplace within the camper. It will be understood that the FIG. 15 construction as viewed could be modified to bring out another bed structure from the left as well as from the right hand side of the camper as viewed, in which case opposite roof panels 10 should be on different levels because of excessive width to be stowed side by side.

Although it would be possible to specially design pickup camper shells, cab-over pickup campers, or other camper vehicles or trailers with my roof panel and cantilevered beds as fundamental parts of the new camping designs, my preferance, illustrated throughout the drawings, is to make minimum modification of existing trailers and vehicles. This is partly because I appreciate the cost advantages (affecting feasibility of my proposals) of integrating into present mass produced trailers and vehicles, with very minimum modification of tooling, parts, etc. The constructions shown in FIGS. 16–19 go a step farther in the direction of not disturbing presently produced configurations by being essentially separate accessory housings 30 which can be temporarily or permanently secured on the tops of various types of vehicles and trailers, including not only new production but also the vehicles and trailers already purchased and owned by individual consumers. Note that housings 30 can be used on folding camping trailers, as well as on other vehicles. The provision of beds to the side in FIGS. 11, 12, 13 and 14 can be made by housings 30 in the manners illustrated in FIGS. 16–20. The purpose would be to provide an extra bed or beds for a folding camping trailer without change to standard trailer construction, including feasibility of selling housing 30 (and roof panel and bed parts) as an optional accessory to be permanently or temporarily mounted, and also available to owners of existing camping trailers.

FIGS. 16 and 17 show two roof panels 10 to be pulled out with their longer dimensions in the direction of pull-out, to provide two double beds side by side. In single bunking, this construction would sleep four persons, and in double bunking this construction would sleep eight persons. When two roof panels (and two double beds thereunder) are disposed side by side, a choice has to be made whether to integrate the roof panels to cover two double beds with one roof and/or to integrate the bed panels with one bed deck accommodating four persons. I have elected to show separation rather than integration so as to maintain roof panels 10 and bed decks 90, 102, and associated structures, as standard articles subject to mass production without having to produce regular width and double width articles. I realize one could elect to go the other way, and adapt to mass production by merely providing special intermediate joining sections or means not essentially disturbing the standard roof and bed panels. For purposes of privacy one might want divider curtains between side-by-side bunks (such privacy curtains being presently used on occasion to divide off bunks from other spaces in folding trailers). It would appear excessive to put a pair of regular curtains 150 on the sides of roof panels and bed decks facing each other. Preferably, special curtains 150 would be used in FIGS. 16 and 17 to enclose merely the ends and exposed sides of the beds, and some type of seal against the weather can be made between adjacent sides of roof and bed panels. It is more likely that roof panels 10 than bed panels 90 will be joined in one section, because the bed panels have to be "manhandled" into and out of camping configuration and joined bed panels would get heavy and unwieldy for installation at least by one person. To a lesser extent double width roof panels are difficult for one person to handle because of weight and friction.

Figure 18:
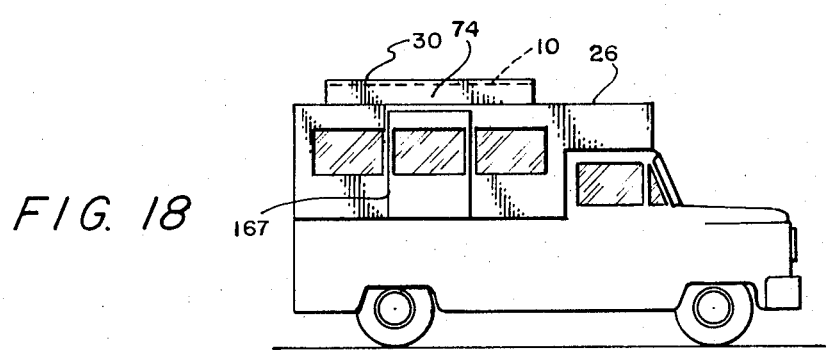
FIG. 18 is a view similar to FIG. 17 but of a modified configuration.

Access to bed space could be from outside of the pickup camper, but another solution to access would be through windows 166 which could have special construction, such as complete removal of window and frame in camping configuration of pickup camper. In FIG. 18, a special access door 167 is provided in the window section of the cab-over configuration. One appeal of the FIGS. 16–17 construction is the complete accommodation of a sizable camping party on cantilevered beds external of the pickup camper, without any commitment of internal camper space for sleeping purposes, if that is deemed desirable.

One capability of housings 30 is also to store bed parts. Note in FIG. 16 that lower bed decks 90 and mattresses 94 are shown stored during transportation below roof panels 10, which leaves the complete inside of the camper (or other vehicle or trailer) free from this roof and bed structure during transportation. Depending on height of housing 30, of course double bunk structures could be accommodated stored in housing 30 below roof panel or panels 10.

Figure 19:
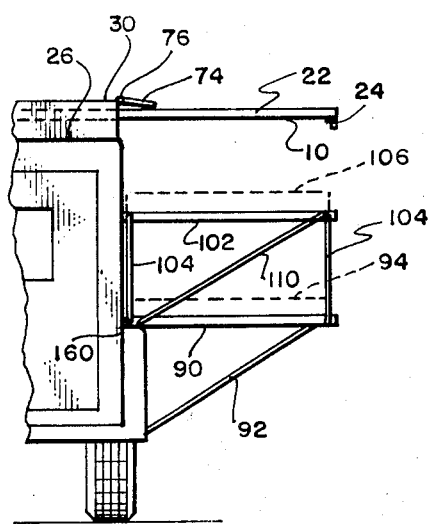
FIG. 19 is an enlarged, partial end view of the assembly shown in FIG. 18, but with the roof panel and bunks in extended positions.

FIGS. 18 and 19 show a configuration of housing 30 in which a single roof panel 10 is housed and pulls out in the direction of the narrower bed dimension, whereby two or four persons are accommodated cantilevered out from the pickup camper (or other vehicle or trailer), the number of persons depending on whether double bunks are used. Double bunks to sleep four persons are shown in FIG. 19.

FIG. 16 shows an external angle iron 170 which is representative of means for permanently or temporarily screwing or bolting or otherwise securing housing 30 to the top 26 of the pickup camper or of other trailer or vehicle.

Figure 20:
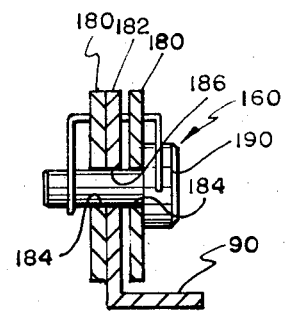
FIG. 20 is an enlarged, fragmentary view, primarily in section, of the means to detachably secure the inner end of the lower bed deck to the camper in FIG. 19.

I will now describe the means 160 to secure the inner end of the lower bed deck 90 to the pickup camper (or other vehicle or trailer). In connection with the folding camping trailer of FIGS. 1–14, standard or modified constructions could be used to secure the inner end of the lower deck panel to the upper edge portion of the trailer, but in other trailers and vehicles some means such as 160 need to be used to secure the inner edge of lower bed panel 90 (and/or the inner edge of upper bed panel 102) to the trailer or camper body. This is illustrated in FIG. 20 as merely taking the form at each inner corner of panel 90 of a pair of ears or lugs 180 secured to the pickup camper and an interfitting ear or lug 182 on panel 90. Ears 180, 182 have matching openings 184, 186 respectively in which is secured a wire-clip-locked pin 190 (like pin 112 in FIG. 10 which was said to be a standard article of manufacture). The other modification to standard camper manufacture would be to provide means for removably securing the lower ends of tube braces 92 which could merely be a pair of ears secured to the camper body (like ears 180 in FIG. 20) as this is a standard way of pinning tube braces to folding camping trailer bodies.

Having thus described my invention, I do not wish to be understood as limiting myself to the precise details of construction shown. Instead I wish to cover those modifications of my invention which will occur to those skilled in the art after learning of my disclosure, and which are properly within the scope of my invention.

I claim:
1. A camping trailer comprising
   a collapsible box-shaped body having a generally flat rigid top,
   means mounting said top for movement from a collapsed position for storage and transportation to an elevated position providing room within said body for occupancy as a camping trailer, a pair of bed panels supported within said body in substantially superposed relationship, means mounting said bed panels for movement outwardly of said body to a vertically spaced double bunk relationship with the lower of said bed panels forming a cantilevered configuration, a flat roof panel of rigid construction, means mounting said roof panel within said body for slidable movement to an outer position covering said bed panels, said roof panel being substantially coplanar with said top to provide an extension thereof, and flexible sheet shelter means extending downwardly from said roof panel to form wall enclosures around said bed panels.

2. The combination according to claim 1, wherein said means mounting said roof panel comprise cantilever support means.

3. The combination according to claim 1, wherein said roof panel is generally rectangular in shape with upstanding flanges around three edges thereof to prevent water runoff into the camping trailer.

4. The combination according to claim 3 wherein at least a portion of said upstanding flanges form part of said means mounting said roof panel.

5. The combination according to claim 1, comprising bracing means interconnecting said pair of bed panels to support the upper of said panels in double bunk relationship.

6. The combination according to claim 5 wherein at least a portion of said bracing means are pivotal mountings.

7. The combination according to claim 1, wherein said bed panels move outwardly from the rear of said camping trailer.

8. The combination according to claim 1, wherein said bed panels move outwardly from a side of said camping trailer.

9. The combination according to claim 1, wherein said means mounting said roof panel includes track support means extending parallel to the path of movement of said roof panel and track follower means engaged with said track support means whereby said track support means and track follower means support said roof panel in its first and second positions and in moving therebetween, one of said track means being secured to said top and the other of said track means being secured to said roof panel.

10. The combination according to claim 9, comprising a hinged depending flange covering said track means in down position and pivotal upwardly to permit said roof panel to assume said outer position.

* * * * *